Figure 1:
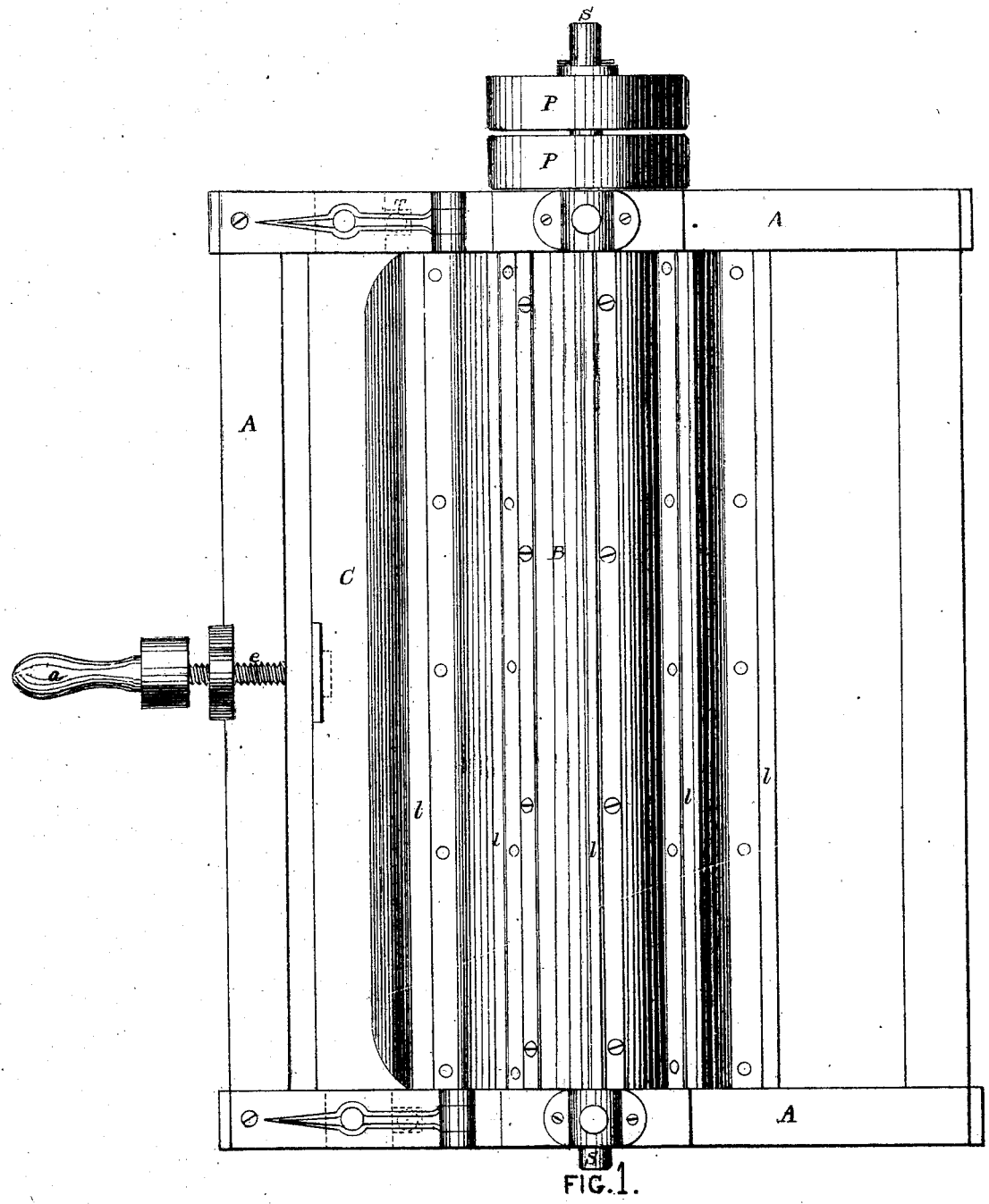

2 Sheets--Sheet 1.

JULES WATTEAU.
Machine for Pulling Wool from Skins.

No. 121,565. Patented Dec. 5, 1871.

WITNESSES.
E. R. Stansbury.
W. R. Stansbury

INVENTOR.
Jules Watteau
By his Attorney
Chas. F. Stansbury

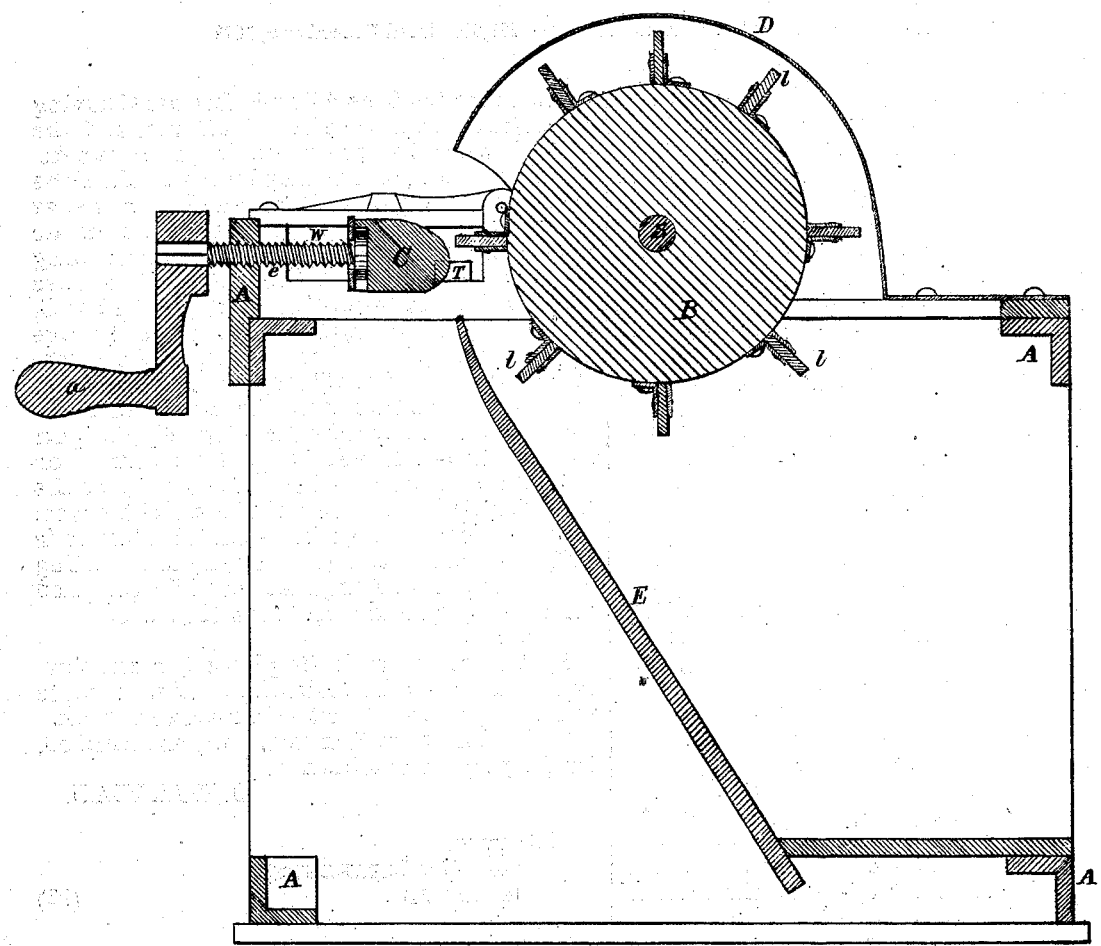

UNITED STATES PATENT OFFICE.

JULES WATTEAU, OF ANTWERP, BELGIUM.

IMPROVEMENT IN MACHINES FOR PULLING WOOL FROM SKINS.

Specification forming part of Letters Patent No. 121,565, dated December 5, 1871.

*To all whom it may concern:*

Be it known that I, JULES WATTEAU, of Antwerp, in Belgium, have invented a new and useful Machine for Pulling Wool from Skins, of which the following is a specification:

In the drawing, Figure 1 is a plan of the machine with the hood protecting the drum removed. Fig. 2 is a sectional elevation, showing those parts which are to the left of a line drawn through the crank and screw. Figs. 3 and 4 are wooden bars which may be used in the place of bar C, which is to be seen in Figs. 1 and 2, and is hereinafter described.

A is the frame of the machine. B is a revolving drum, furnished, as shown, with plates $l$, made of caoutchouc or other material of considerable elasticity, and yet sufficiently rigid. The drum has a hood, D, as shown. C is a bar of wood for the skin to rest upon. Its ends travel in ways $w$ in the upper part of the frame, a crank, $a$, and screw, $e$, serving to move the bar backward and forward. In each of the ways is a stop, T, to determine the distance between the revolving elastic plates or strikers and the wooden bar. The stops T may be made in the form of wedges, sliding in and out, so that the distance determined by them may be greater or less, according to the thickness of the skin or other circumstances. E is a partition to cause the wool pulled from the skin to fall into an apartment within the frame intended for the wool alone. S is the shaft, and P a fast-and-loose pulley by which the drum is revolved.

The operation is as follows: The bar C having been drawn back a sufficient distance and the stops T being in proper position, as above described, the pelt is drawn up by the hands of the operator under the partition E and over the bar C; the operator then, turning the crank until the bar C is brought up against the stops and setting the drum in motion, with both hands continues to draw the pelt toward himself over the bar C, and the elastic strikers $l$ in their revolution strike the wool and pull it from the skin. As before stated, the bar C′ or C″ may be substituted for the bar C. The bars C′ and C″ have at each end a portion, at $y$, cut away, leaving only the part $x$ to furnish resistance and operate in connection with the revolving strikers. By the use of the bar C′ or C″ in the place of the bar C the wool may, to a certain degree, be sorted while it is pulled, the part $x$ being first employed in cutting a path in the wool along the back of the skin, and afterward to pull the wool from the sides.

I claim—

1. The revolving elastic plates $l$, in combination with the bar C, substantially as described, to pull the wool from a pelt drawn between them.

2. The bar C′ or C″, substantially as described, for the purpose described.

J. WATTEAU.

Witnesses:
CH. VAN LIEBERGEN,
M. ELDEN.

(92)